United States Patent [19]
Lin

[11] Patent Number: 5,566,997
[45] Date of Patent: Oct. 22, 1996

[54] CORN SKEWER

[75] Inventor: Cheng T. Lin, Tainan Hsien, Taiwan

[73] Assignee: Jyudung Plastics Corporation, Tainan Hsien, Taiwan

[21] Appl. No.: 597,034

[22] Filed: Feb. 5, 1996

[51] Int. Cl.⁶ ................................................ A47G 21/00
[52] U.S. Cl. ................................ 294/5; 99/419; 99/532; 294/61; D7/683
[58] Field of Search .................... 99/419, 532; 294/5, 294/61; D7/683, 684; 30/143

[56] References Cited

U.S. PATENT DOCUMENTS

| D. 268,723 | 4/1983 | Wolff | D7/683 |
| D. 274,207 | 6/1984 | Lenaghan | D7/683 |
| 3,995,902 | 12/1976 | Sciaino, Jr. | 30/143 X |
| 5,088,782 | 2/1992 | Scott | 294/5 |

*Primary Examiner*—Timothy F. Simone
*Attorney, Agent, or Firm*—Bacon & Thomas

[57] ABSTRACT

A corn skewer comprises a grip, a blocking ring disposed at the proximal end of the grip, and a hollow insert extending forward from the blocking ring. The hollow insert has a tapered end. A plurality of positioning ribs abut the hollow insert to reinforce the hollow insert. The corn skewers is made in one piece by injection molding. Two corn skewers can position a corncob via two ends of the corncob. The hollow insert is inserted in the corncob until the end of the corncob is blocked by the blocking ring.

1 Claim, 2 Drawing Sheets

CORN SKEWER

BACKGROUND OF THE INVENTION

The invention relates to a corn skewer. More particularly, the invention relates to a reinforced corn skewer for holding a corncob.

Referring to FIG. 1, a conventional corn skewer has a grip 1 and two metal inserts 2 extending forward from the grip 1. Each of the metal inserts 2 has a sharp tip. Since the tip is very sharp, the user may be hurt by the tip. The metal inserts 2 may be rusted to produce the rusted materials on the surface of the metal inserts 2. The user may eat the grains of the corn with the rusted materials.

SUMMARY OF THE INVENTION

An object of the invention is to provide a reinforced corn skewer for holding a corncob stably.

Another object of the invention is to provide a plurality of positioning ribs for reinforcing the corn skewer.

Another object of the invention is to provide a plurality of positioning ribs in order to limit the rotation of the corncob.

Accordingly, a corn skewer comprises a grip, a blocking ring disposed at tile proximal end of the grip, and a hollow insert extending forward from the blocking ring. The hollow insert has a tapered end. The tapered end of the hollow insert has a curved smooth end. Since the tapered end of the hollow insert is not sharp, the user will not be hurt by the tapered end. A plurality of positioning ribs abut the hollow insert in order to reinforce the hollow insert. The corn skewers of the invention can be made in one piece by injection molding. Two corn skewers can position a corncob via two ends of the corncob. The hollow insert is inserted in the corncob until the end of the corncob is blocked by the blocking ring. Thus the positioning ribs can limit the rotation of the corncob.

DETAILED DESCRIPTION OF THE INVENTION

Figure 2:
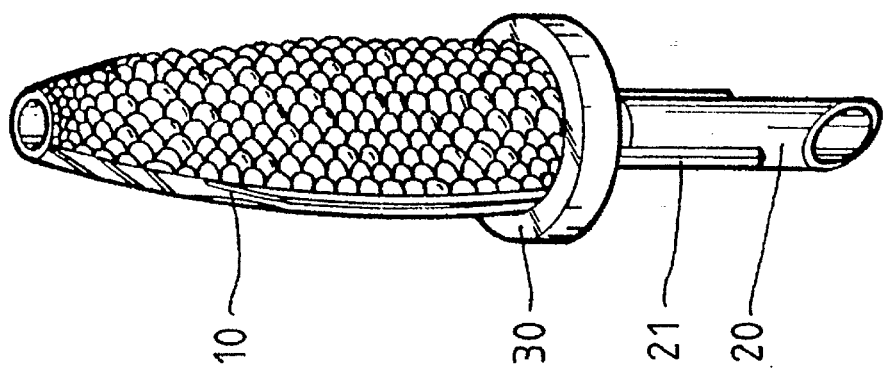
FIG. 2 is a perspective view of a corn skewer of a preferred embodiment in accordance with the invention.
Figure 1:
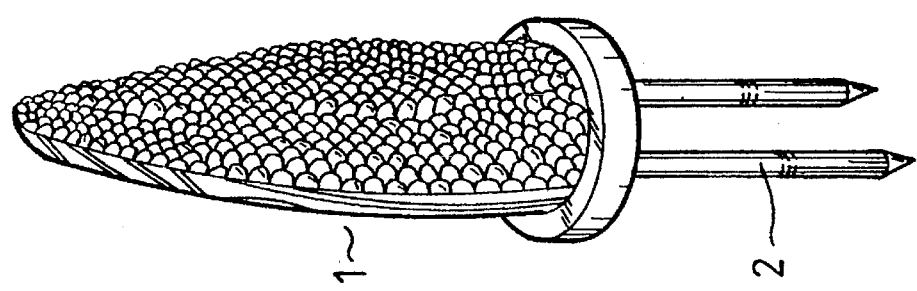
FIG. 1 is a perspective view of a conventional corn skewer of the prior art.

Referring to FIG. 2, a corn skewer comprises a grip 10, a blocking ring 30 disposed at the proximal end of the grip 10, and a hollow insert 20 extending forward from the blocking ring 30. The hollow insert 20 has a tapered end. The tapered end of the hollow insert 20 has a curved smooth end. Since the tapered end of the hollow insert 20 is not sharp, the user will not be hurt by the tapered end. A plurality of positioning ribs 21 abut the hollow insert 20 in order to reinforce the hollow insert 20. The corn skewers of the invention can be made in one piece by injection molding.

Figure 3:
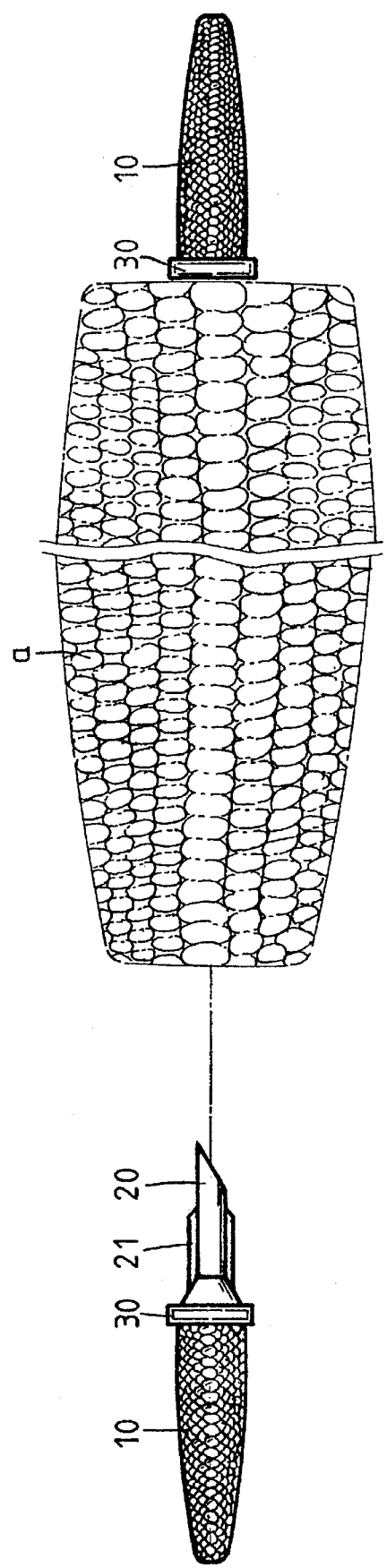
FIG. 3 is a perspective schematic view illustrating the application of a corn skewer.

Referring to FIG. 3, two corn skewers position a corncob via two ends of the corncob. The hollow insert 20 is inserted in the corncob until the end of the corncob is blocked by the blocking ring 30. Thus the positioning ribs 21 can limit the rotation of the corncob.

The invention is not limited to the above embodiment but various modification thereof may be made. Further, various changes in form and detail may be made without departing from the scope of the invention.

I claim:

1. A corn skewer comprising:

a grip;

a blocking ring disposed at a proximal end of said grip;

a hollow insert extending forward from said blocking ring;

said hollow insert having a tapered end;

a plurality of positioning ribs abutting said hollow insert to reinforce said hollow insert; and said corn skewers is made in one piece by injection molding.

* * * * *